(12) United States Patent
Yoshida

(10) Patent No.: US 12,359,974 B2
(45) Date of Patent: Jul. 15, 2025

(54) COLORIMETRIC APPARATUS

(71) Applicant: SEIKO EPSON CORPORATION, Tokyo (JP)

(72) Inventor: Hiroshi Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 18/166,074

(22) Filed: Feb. 8, 2023

(65) Prior Publication Data

US 2023/0251138 A1    Aug. 10, 2023

(30) Foreign Application Priority Data

Feb. 9, 2022  (JP) .................... 2022-018523

(51) Int. Cl.
  *G01J 3/52* (2006.01)
  *G01B 21/22* (2006.01)
(52) U.S. Cl.
  CPC ................ *G01J 3/52* (2013.01); *G01B 21/22* (2013.01)
(58) Field of Classification Search
  CPC .. G01J 3/52; G01J 3/524; G01J 3/0202; G01J 3/027; G01J 3/0272; G01J 3/0278; G01J 3/0289; G01J 3/0291; G01J 3/50; G01B 21/22; G01N 21/01; G01N 21/293; G01N 21/31; G01N 2021/0118
  See application file for complete search history.

(56) References Cited

U.S. PATENT DOCUMENTS

| 5,986,769 A * | 11/1999 | Krzyminski .............. G01J 3/50 |
| | | 356/445 |
| 6,825,919 B2 * | 11/2004 | Beimers ................ G01J 3/0278 |
| | | 356/402 |
| 7,345,763 B2 | 3/2008 | Baker et al. |

FOREIGN PATENT DOCUMENTS

JP        2002-094820 A      3/2002

* cited by examiner

*Primary Examiner* — Jonathan M Hansen
(74) *Attorney, Agent, or Firm* — WORKMAN NYDEGGER

(57) ABSTRACT

A colorimetric apparatus includes: an opening portion that is disposed at a bottom of an apparatus main body and that introduces light arriving from a measurement target to inside the apparatus main body; an incident light processing unit that processes light incident through the opening portion; a rotor that is provided at the bottom of the apparatus main body and is in contact with the measurement target, the rotor having an elliptical shape and being driven to rotate about a rotary shaft when the apparatus main body moves in a predetermined direction; a detector that detects displacement of the rotary shaft in a direction in which the rotary shaft advances and retreats with respect to the measurement target as the rotor rotates; and a control unit that receives a signal from the incident light processing unit and the detector.

9 Claims, 8 Drawing Sheets

COLORIMETRIC APPARATUS

The present application is based on, and claims priority from JP Application Serial Number 2022-018523, filed Feb. 9, 2022, the disclosure of which is hereby incorporated by reference herein in its entirety.

BACKGROUND

1. Technical Field

The present disclosure relates to a colorimetric apparatus that performs color measurement based on light arriving from a measurement target.

2. Related Art

As described in JP-A-2002-94820, typically, color measurement is performed using a color chart in which a plurality of color patches are arranged, creating a profile corresponding to an output device, and the profile is used to improve color reproduction on the output device.

In a case in which a colorimetric apparatus is slid in a predetermined direction on a color chart to continuously measure a plurality of color patches, a piece of software that generates a profile typically determines that an adjacent color patch is a color patch of a different color based on a color difference between adjacent color patches. However, when the color difference between adjacent color patches is small, the piece of software sometimes cannot determine that the two adjacent color patches are color patches of different colors, and thereafter a difference may occur between the colors of the color patches that have been measured and the colors of the color patches acquired by the software, resulting in a color measurement error.

SUMMARY

A colorimetric apparatus according to an aspect of the present disclosure that solves the above problems includes: an opening portion that is disposed at a bottom of an apparatus main body and that introduces light arriving from a measurement target to inside the apparatus main body; an incident light processing unit that processes light incident through the opening portion; a rotor that is provided at the bottom of the apparatus main body and is in contact with the measurement target, the rotor having an elliptical shape and being driven to rotate about a rotary shaft when the apparatus main body moves in a predetermined direction; a detector that detects displacement of the rotary shaft in a direction in which the rotary shaft advances and retreats with respect to the measurement target as the rotor rotates; and a control unit that receives a signal from the incident light processing unit and the detector.

A colorimetric apparatus according to another aspect of the present disclosure includes: an opening portion that is disposed at a bottom of an apparatus main body and that introduces light arriving from a measurement target to inside the apparatus main body; an incident light processing unit that processes light incident through the opening portion; a rotor that is provided at the bottom of the apparatus main body and is in contact with the measurement target, the rotor being driven to rotate when the apparatus main body moves in a predetermined direction; a detector that detects the rotation of the rotor; and a control unit that receives a signal from the incident light processing unit and the detector.

DESCRIPTION OF EXEMPLARY EMBODIMENTS

Figure 1:
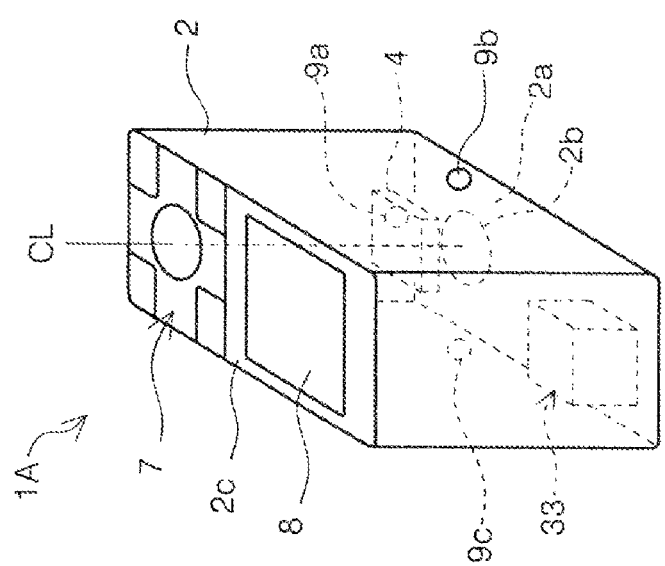
FIG. 1 is a perspective view of a colorimetric apparatus.

Hereinafter, the present disclosure will be schematically described.

A colorimetric apparatus according to a first aspect includes: an opening portion that is disposed at a bottom of an apparatus main body and that introduces light arriving from a measurement target to inside the apparatus main body; an incident light processing unit that processes light incident through the opening portion; a rotor that is provided at the bottom of the apparatus main body and is in contact with the measurement target, the rotor having an elliptical shape and being driven to rotate about a rotary shaft when the apparatus main body moves in a predetermined direction; a detector that detects displacement of the rotary shaft in a direction in which the rotary shaft advances and retreats with respect to the measurement target as the rotor rotates; and a control unit that receives a signal from the incident light processing unit and the detector.

According to the present aspect, the rotation of the rotor when the apparatus main body is moved in the predetermined direction can be detected through displacement of the rotary shaft. Since the outer circumference of the rotor is known, a displacement of the apparatus main body in the predetermined direction can be acquired based on the rotation of the rotor, that is, the displacement of the rotary shaft. Accordingly, a displacement from a measurement start position to a measurement position can be acquired, and thus the occurrence of a color measurement error can be suppressed compared to a configuration in which adjacent color patches are identified based on a color difference between the adjacent color patches.

A second aspect is the first aspect in which the rotary shaft is supported by a supporting member, the supporting member is configured to be displaced in a direction in which the supporting member advances and retreats with respect to the measurement target and is pressed toward the measurement target by a pressing member, and the detector detects displacement of the rotary shaft through the supporting member.

According to the present aspect, the detector is configured to detect the displacement of the rotary shaft through the supporting member; as such, the degree of freedom in disposing the detector is improved, and the degree of freedom in design is improved.

A third aspect is the first aspect or the second aspect in which the measurement target is a color chart having a plurality of color patches that are arranged, an integral multiple of a circumference of the rotor or an integral multiple of a half of the circumference corresponding to a width of the color patches.

According to the present aspect, the measurement target is a color chart in which a plurality of color patches are arranged, an integral multiple of a circumference of the rotor or an integral multiple of a half of the circumference corresponding to a width of the color patches; as such, a color measurement position with respect to the color patches is easily acquired.

A fourth aspect is the third aspect in which the rotor is detachably provided.

According to the present aspect, the rotor is detachably provided; as such, the rotor can be replaced with one having an outer circumference suitable for the width of the color patches, allowing the rotor to work with various types of color charts.

A colorimetric apparatus according to a fifth aspect of the present disclosure includes: an opening portion that is disposed at a bottom of an apparatus main body and that introduces light arriving from a measurement target to inside the apparatus main body; an incident light processing unit that processes light incident through the opening portion; a rotor that is provided at the bottom of the apparatus main body and is in contact with the measurement target, the rotor being driven to rotate when the apparatus main body moves in a predetermined direction; a detector that detects the rotation of the rotor; and a control unit that receives a signal from the incident light processing unit and the detector.

According to the present aspect, an amount of rotation of the rotor when the apparatus main body is moved in the predetermined direction can be detected by the detector. Since the outer circumference of the rotor is known, a displacement of the apparatus main body in the predetermined direction can be acquired based on the amount of rotation of the rotor. Accordingly, a displacement from a measurement start position to a measurement position can be acquired, and thus the occurrence of a color measurement error can be suppressed compared to a configuration in which adjacent color patches are identified based on a color difference between the adjacent color patches.

A sixth aspect is the fifth aspect in which the rotor is configured to be displaced in a direction in which the rotor advances and retreats with respect to the measurement target and is pressed toward the measurement target by a pressing member.

According to the present aspect, the rotor is configured to be displaced in a direction in which the rotor advances and retreats with respect to the measurement target and is pressed toward the measurement target by a pressing member; as such, a good contact state between the rotor and the measurement target can be maintained.

Hereinafter, the present disclosure will be described in detail.

A colorimetric apparatus 1A in FIG. 1 is an apparatus that measures a color chart M (see FIG. 2), which will be described later, and sends a color measurement result to a computer that is not illustrated.

The colorimetric apparatus 1A according to the present embodiment is a hand-held type colorimetric apparatus that can be held and operated by a user with one hand. The colorimetric apparatus 1A includes, inside an apparatus main body 2, a battery (not illustrated) that is a source of power supply of the apparatus and an incident light processing unit 4 that processes incident light. Although a detailed description of the incident light processing unit 4 is omitted, the incident light processing unit 4 in the present embodiment includes an optical filter that is not illustrated.

The optical filter selectively transmits a wavelength component of light incident on the inside of the apparatus. The light transmitted through the optical filter is incident on a photoreceptor element, specifically, a photodiode, which is not illustrated. Then, the intensity of the incident light is converted into a voltage value and output to a control unit 10 (see FIG. 3). The colorimetric apparatus 1A repeatedly performs selection of wavelength by the optical filter and acquisition of the received light intensity to measure the spectrum of a color measurement target. In the present embodiment, the optical filter is a tunable Fabry-Perot etalon, which is a wavelength filter using multiple interference between two reflective surfaces facing each other. It goes without saying that the incident light processing unit 4 is not limited to a configuration including such an optical filter. The tunable Fabry-Perot etalon is configured to select a wavelength by controlling a distance in an optical axis direction between a pair of mirrors (not illustrated) disposed to face each other and spaced apart in the optical axis direction.

An opening portion 2b is formed at a bottom surface 2a of the apparatus, and incident light traveling from the color measurement target toward the incident light processing unit 4 enters the inside of the apparatus through the opening portion 2b. The opening portion 2b has a perfect circular shape centered on an optical axis CL. The optical axis CL is an optical axis of incident light traveling from the color measurement target to the incident light processing unit 4.

A light emitting unit that is not illustrated is provided inside the opening portion 2b, and light emitted from the light emitting unit travels through the opening portion 2b toward the outside of the apparatus and irradiates the color measurement target facing the bottom surface 2a.

In the present embodiment, the colorimetric apparatus 1A obtains a coordinate in the L*a*b* color space corresponding to a digital signal obtained by the incident light processing unit 4, and outputs the coordinate as a colorimetric value to a computer that is not illustrated.

An operation unit 7 for performing various operations and a display unit 8 for displaying various information are provided on an upper surface 2c of the apparatus. The operation unit 7 will be further described below with reference to FIG. 2.

The user holds and uses the colorimetric apparatus 1A using one hand with the display unit 8 in front of the user. At this time, the operation unit 7 is at a position where it can be operated by the user with a finger. The operation unit 7 includes a confirm button 7a at the center. Pressing the confirm button 7a can confirm various settings or perform color measurement. The operation unit 7 also includes a directional pad 7b, which can be used to select various items and change various settings.

The confirm button 7a is disposed in the central portion of the directional pad 7b, and the directional pad 7b is formed in a shape extending vertically and horizontally from the central portion. A horizontal mark 7c extending in the left-right direction is placed on the left and the right pad portions of the directional pad 7b, and a vertical mark 7d extending in the up-down direction is placed on the upper and the lower pad portions of the directional pad 7b.

The confirm button 7a has a perfect circular shape in plan view, and the center position of the confirm button 7a aligns with the position of the optical axis CL. Further, a position at which an imaginary line (not illustrated) obtained by extending the horizontal mark 7c and an imaginary line (not illustrated) obtained by extending the vertical mark 7*d* intersect with each other corresponds to the position of the optical axis CL.

Figure 2:
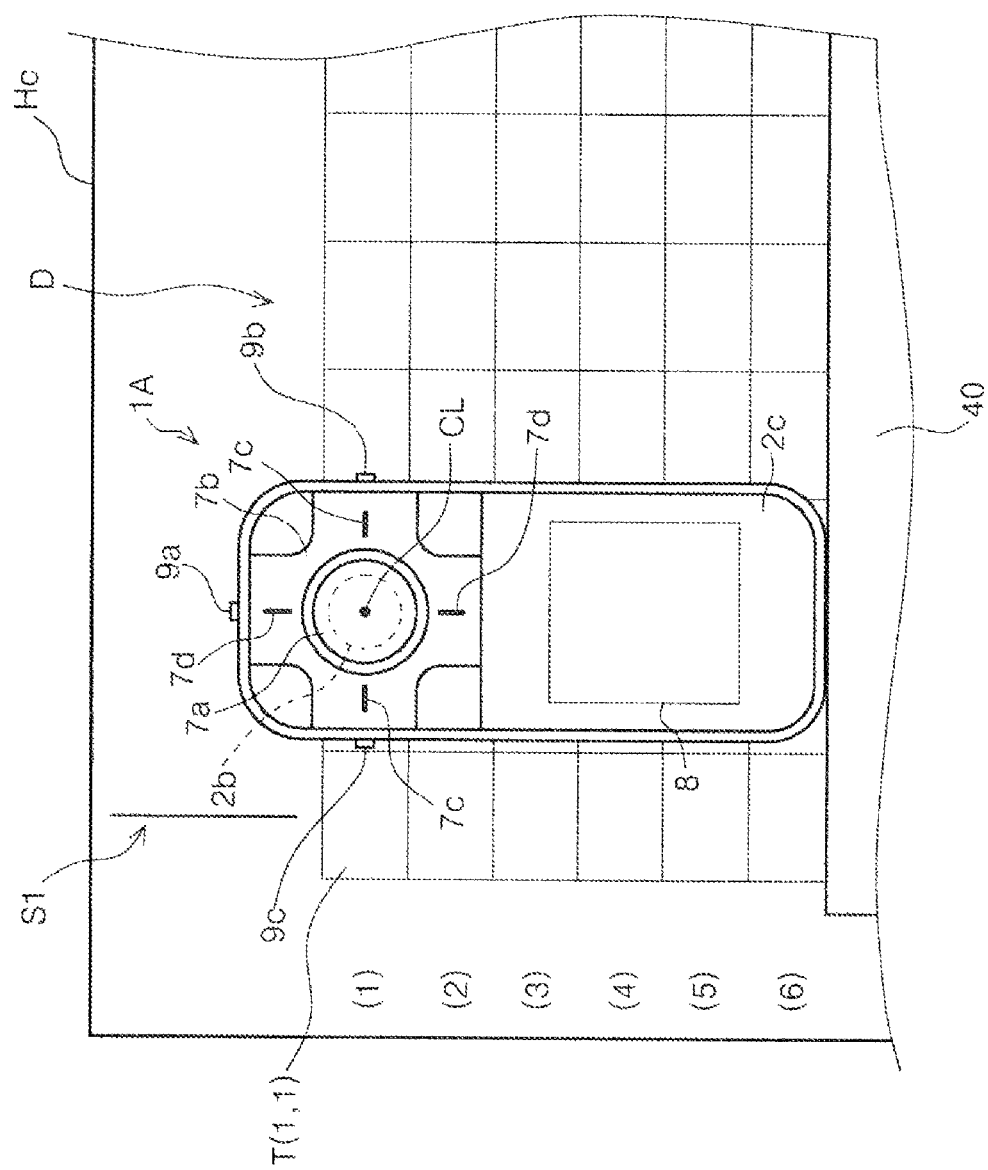
FIG. 2 is a diagram illustrating a relationship between the colorimetric apparatus and a color chart.

With such a configuration, as illustrated in FIG. 2, alignment of the color measurement position becomes extremely easy when the colorimetric apparatus 1A is viewed in plan view.

Furthermore, alignment portions 9*a*, 9*b*, and 9*c* are provided on an outer surface of the apparatus main body 2 at positions close to the bottom surface 2*a* (see FIG. 1). The location of the alignment portion 9*a* is on an imaginary line (not illustrated) extending from the vertical mark 7*d* in plan view, and the alignment portion 9*a* is formed slightly protruding from the outer surface of the apparatus main body 2. The locations of the alignment portions 9*b* and 9*c* are on an imaginary line (not illustrated) extending from the horizontal mark 7*c* in plan view, and the alignment portions 9*b* and 9*c* are formed slightly protruding from the outer surface of the apparatus main body 2. Such alignment portions 9*a*, 9*b*, and 9*c* also make the alignment of the color measurement position extremely easy.

FIG. 2 illustrates an example of a color chart printed on a sheet Hc. A color chart M, which is an example of a color chart, contains a plurality of color patches T arranged in a grid. Any color patch can be represented by T (m, n), where m is the row number and n is the column number. Different colors are given to the plurality of color patches T (m, n).

On the left side of the color chart M, numbers indicating row numbers are placed. As an example, the user aligns the measurement start position with a color patch T (1, 1), slides the colorimetric apparatus 1A in the right direction that is the row direction in FIG. 2 while holding the confirm button 7*a*, and measures a row of color patches including the color patch T (1, 1). Note that at this time, the user may use a guide member 40 to slide the colorimetric apparatus 1A along the guide member 40.

Note that the user may start the color measurement from the margin on the left side of the color patch T (1, 1). When the row of color patches is measured, the user repeats this process in the same manner until all rows are measured. When all color patches T (m, n) are measured, the color differences between the colorimetric values and the reference values of the corresponding color patches are calculated by a computer that is not illustrated and that is connected to the colorimetric apparatus 1A. Based on the results of the calculation, profile data corresponding to a device (for example, a printer or a display) is generated.

Note that, an alignment mark S1 is placed on an upper portion of the first column of the color patches T (m, n), and the color measurement position can be easily aligned with the first column by aligning the alignment mark S1 with the alignment portion 9*a*.

Figure 3:
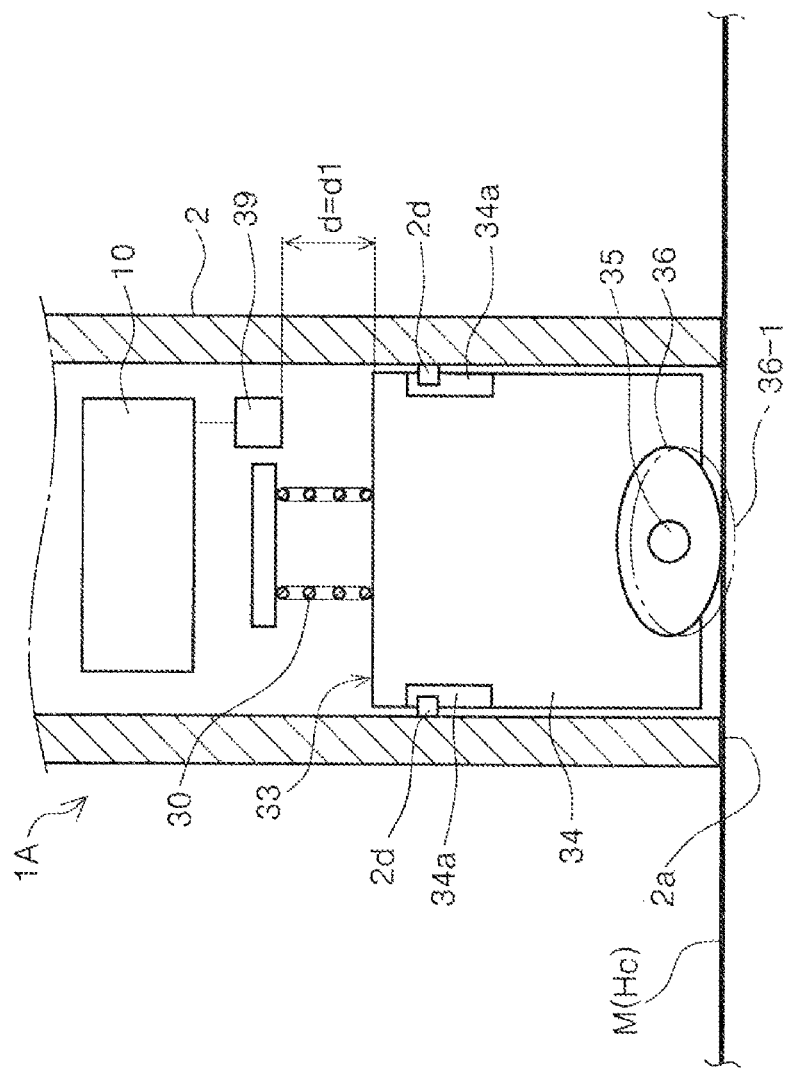
FIG. 3 is a cross-sectional view of a main part of the colorimetric apparatus.
Figure 4:
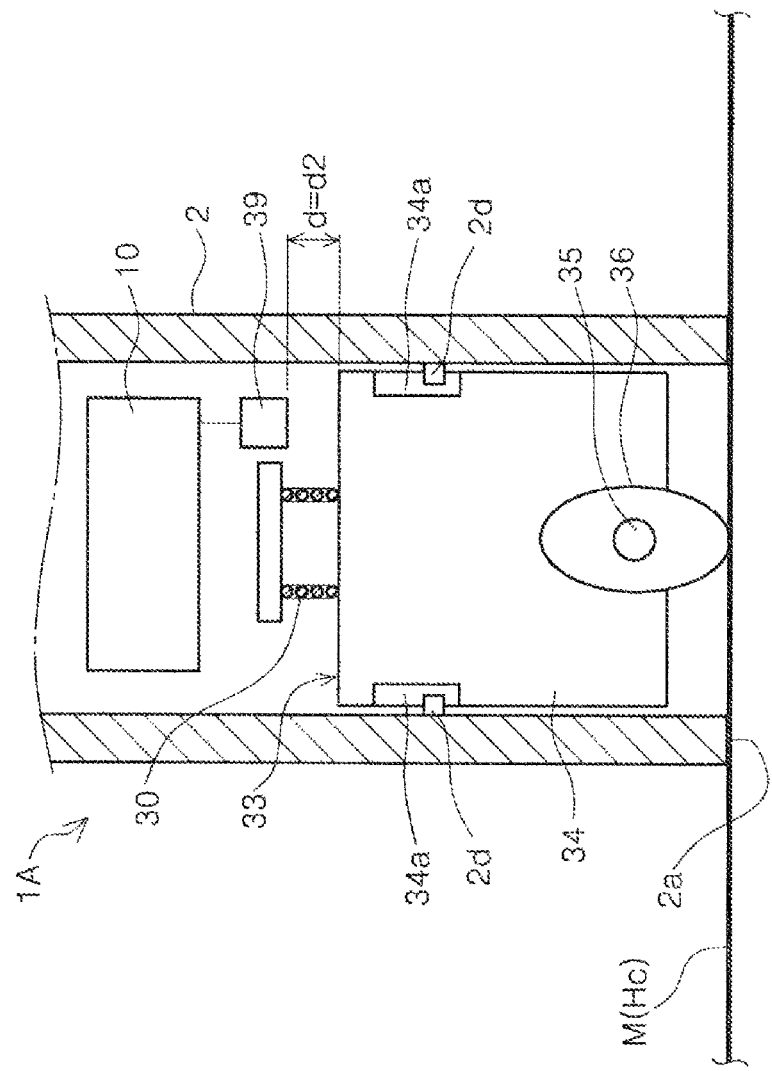
FIG. 4 is a cross-sectional view of the main part of the colorimetric apparatus.

Next, as illustrated in FIGS. 3 and 4, a driven roller 36 which is an example of a rotor is provided at the bottom of the apparatus main body 2. The driven roller 36 is configured to rotate about a rotary shaft 35. A shaft center line of the rotary shaft 35 is parallel to the up-down direction in FIG. 2, that is, the column direction.

The outer circumference of the driven roller 36 has an elliptical shape whose diameter changes along the circumferential direction.

Figure 5:
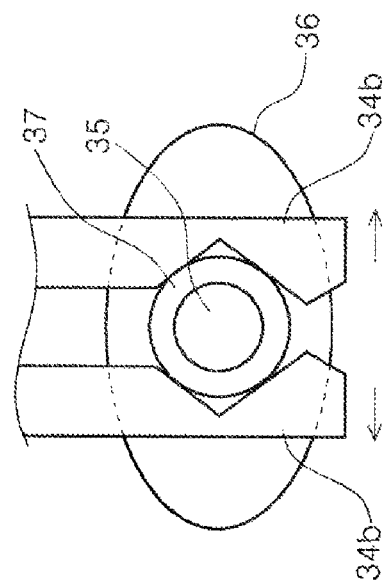
FIG. 5 is a front view of a shaft support portion that supports a rotary shaft of a driven roller.

The rotary shaft 35 is supported by a supporting member 34 constituting a movable unit 33. In FIG. 5, the reference numeral 34*b* denotes a shaft support portion formed in the supporting member 34, and the rotary shaft 35 is supported by the shaft support portion 34*b* via a bearing 37.

The shaft support portion 34*b* is elastic and can be opened in the directions of the arrows from the state illustrated in FIG. 5, allowing the rotary shaft 35 and the bearing 37 to be removed from the shaft support portion 34*b*. The user can remove the driven roller 36 from the apparatus main body 2 by removing the rotary shaft 35 from the shaft support portion 34*b*. That is, the driven roller 36 is detachable with respect to the apparatus main body 2.

Referring back to FIGS. 3 and 4, the supporting member 34, which constitutes a base body of the movable unit 33, is configured to change its position in the apparatus main body 2 along the up-down direction, that is, in a direction in which the supporting member 34 advances and retreats with respect to the measurement target. A recessed portion 34*a* is formed on a side surface of the supporting member 34, and a restricting portion 2*d* that has a protruding shape and that is formed inside the apparatus main body 2 enters the recessed portion 34*a*. As such, the movement range of the supporting member 34, that is, the movable unit 33, in the up-down direction is restricted.

A pressing spring 30 which is an example of a pressing member is provided on an upper portion of the supporting member 34, and the supporting member 34, that is, the movable unit 33, is pressed downward, that is, in a direction toward the measurement target. In a state in which the colorimetric apparatus 1A is not pressed toward the measurement target, the driven roller 36 slightly protrudes downward from the bottom surface 2*a* of the apparatus main body 2, as indicated by a dash-double-dot line and a reference numeral 36-1 in FIG. 3. When the apparatus main body 2 is pressed toward the measurement target during color measurement, the driven roller 36 no longer protrudes downward from the bottom surface 2*a* of the apparatus main body 2, as indicated by a solid line, and the driven roller 36 is pressed toward the measurement target while being in such a state.

With the above-described configuration, when the colorimetric apparatus 1A is in a state in which the color measurement start position is aligned with, for example, the color patch T (1, 1) in FIG. 2, and as the user moves the colorimetric apparatus 1A in a predetermined direction, such as the right direction that is the row direction in the drawing, the driven roller 36 is driven to rotate while being in contact with the sheet Hc.

Note that at least an outer circumferential portion of the driven roller 36 is preferably formed of a high-friction material such as rubber so that the driven roller 36 is driven to rotate more reliably.

Also note that, when the user starts color measurement, the initial phase of the driven roller 36 is preferably adjusted to the state in FIG. 3 instead of the state in FIG. 4, the state in FIG. 3 being a state in which the outer circumferential portion of the elliptical driven roller 36 having the smallest diameter is in contact with the central portion of the color patch T (1, 1).

Next, a distance detector 39 is provided at a position opposite an upper surface of the supporting member 34. The distance detector 39 obtains a distance d between the upper surface of the supporting member 34 and the distance detector 39 and transmits the distance d to the control unit 10. A known optical distance measuring sensor, an ultrasonic distance measuring sensor, or the like can be used as the distance detector 39.

Figure 6B:
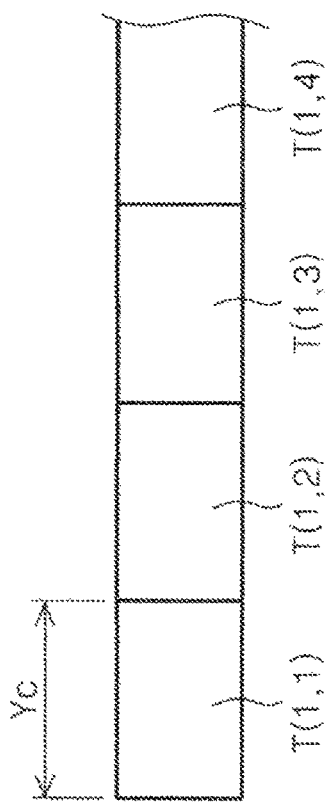
FIG. 6B is a diagram illustrating color patches.
Figure 6A:
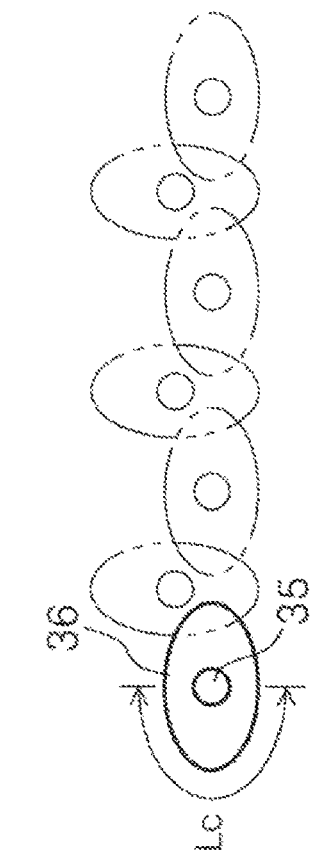
FIG. 6A is a diagram illustrating a posture transition of the driven roller.

When the colorimetric apparatus 1A is moved in the right direction in FIG. 6 with the color patch T (1, 1) as the measurement start position, the driven roller 36 rotates, as indicated by a dash-double-dot line in FIG. 6A. Since the driven roller 36 has an elliptical shape, the rotary shaft 35 moves up and down, that is, the movable unit 33 moves up and down, changing the distance d. Regarding the distance d, a distance d1 illustrated in FIG. 3 is the longest, and the distance d2 illustrated in FIG. 4 is the shortest.

Figure 6C:
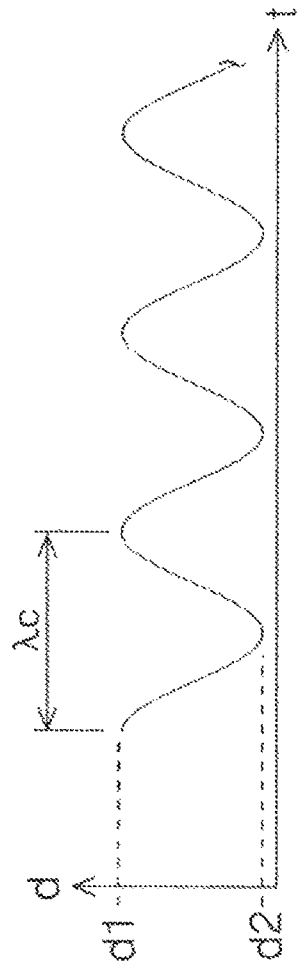
FIG. 6C is a diagram illustrating an output waveform of a distance detector.

Here, in the present embodiment, a length Lc that is a half of the outer circumference of the driven roller 36 is equal to a width Yc of the color patch T (m, n). As illustrated in FIG. 6C, a wavelength λc in the waveform of the distance d is equal to the length Lc and equal to the width Yc.

Therefore, in a case in which the color patch T (1, 1) is set as the measurement start position, and after the first color patch T (1, 1) is measured, the control unit 10 can reliably measure the center position of the color patch T (m, n) in an order of the center position of the color patch T (1, 2), the center position of the color patch T (1, 3), and the center position of the color patch T (1, 4) by performing the color measurement when the distance d reaches the maximum value of the waveform of the distance d.

As described above, the colorimetric apparatus 1A according to the present embodiment includes: the driven roller 36 that is a rotor provided at the bottom of the apparatus main body 2 and that is in contact with the measurement target, the driven roller 36 having an elliptical shape and being driven to rotate about the rotary shaft 35 when the apparatus main body 2 moves in a predetermined direction; the distance detector 39 which is a detector that detects displacement of the rotary shaft 35 in a direction in which the rotary shaft 35 advances and retreats with respect to the measurement target as the driven roller 36 rotates; and the control unit 10 that receives a signal from the incident light processing unit 4 and the distance detector 39.

With such a configuration, the rotation of the driven roller 36 when the apparatus main body 2 is moved in the predetermined direction can be detected through the displacement of the rotary shaft 35. Since the outer circumference of the driven roller 36 is known, the displacement of the apparatus main body 2 in a predetermined direction can be acquired based on the rotation of the driven roller 36, that is, the displacement of the rotary shaft 35. Accordingly, a displacement from a measurement start position to a measurement position (optical axis CL) can be acquired, and thus the occurrence of a color measurement error can be suppressed compared to a configuration in which adjacent color patches are identified based on a color difference between the adjacent color patches.

Furthermore, the rotary shaft 35 is supported by the supporting member 34, the supporting member 34 is configured to change its position in a direction in which the supporting member 34 advances and retreats with respect to the measurement target and is pressed toward the measurement target by the pressing spring 30 in a direction advancing toward the measurement target, and the distance detector 39 detects displacement of the rotary shaft through the supporting member 34. Such a configuration allows for a higher degree of freedom of arrangement of the distance detector 39 and a higher degree of freedom of design.

However, the present disclosure is not limited to such a configuration, and the distance detector 39 may directly detect, for example, the distance between the distance detector 39 and the outer circumferential surface of the rotary shaft 35 or the distance between the distance detector 39 and the outer circumferential surface of the driven roller 36.

In addition, as described above, the measurement target is the color chart M in which the plurality of color patches T (m, n) are arranged, and the length Lc that is a half of the circumference of the driven roller 36 corresponds to the width Yc of the color patch T (m, n). This makes it easy to acquire the color measurement position with respect to the color patch T (m, n).

Note that, for example, assuming that the circumference of the driven roller 36 is a length Ld, an integral multiple of the length Ld may be equal to the width Yc of the color patch T (m, n). Alternatively, an integral multiple of two or more times of the length Lc, which is a half of the circumference of the driven roller 36, may be equal to the width Yc of the color patch T (m, n).

Further, in the present embodiment, the driven roller 36 is detachably provided. Accordingly, the driven roller 36 can be replaced with one having an outer circumference suitable for the width Yc of the color patch T (m, n), allowing the driven roller 36 to work with various types of color charts.

Next, other embodiments of the colorimetric apparatus will be described. Note that, the configurations of the colorimetric apparatuses described below are the same as that of the colorimetric apparatus 1A according to the above-described embodiment except for the parts that are specifically described.

Figure 7:
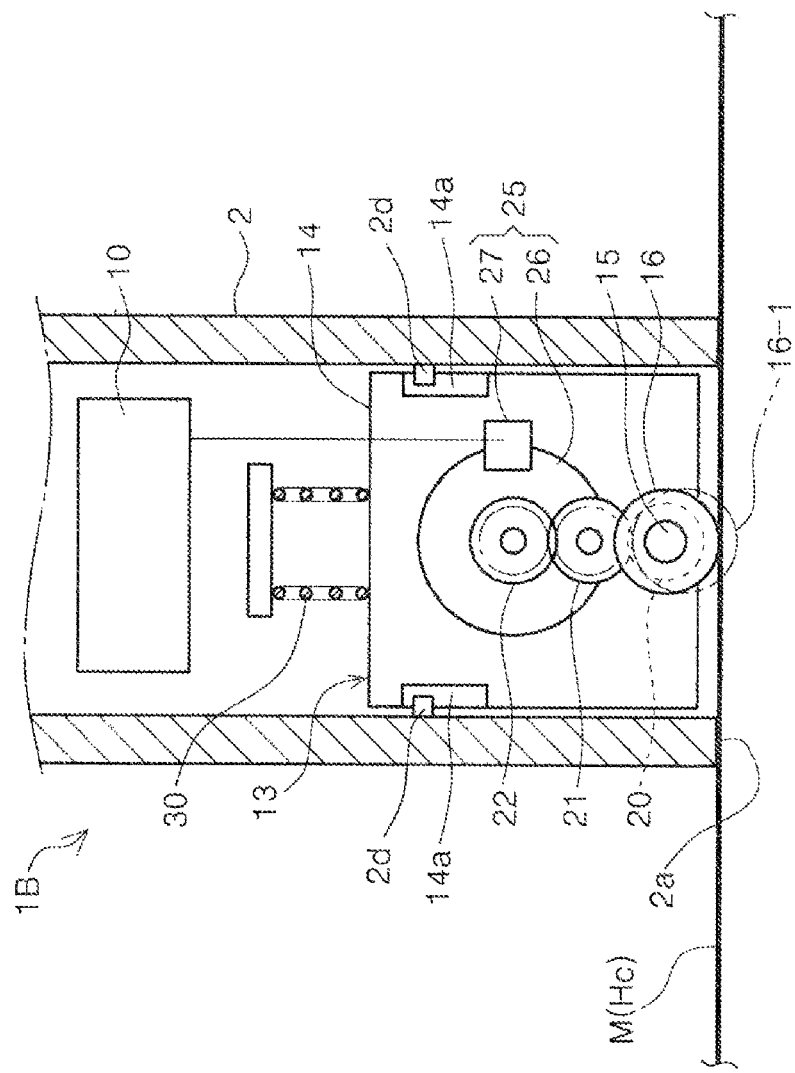
FIG. 7 is a cross-sectional view of a main part of a colorimetric apparatus according to another embodiment.

In a colorimetric apparatus 1B illustrated in FIG. 7, a movable unit 13 includes a driven roller 16 as a rotor. Unlike the above-described driven roller 36, the driven roller 16 has a perfect circular shape.

The driven roller 16 is configured to rotate about a rotary shaft 15. A shaft center line of the rotary shaft 15 is parallel to the up-down direction in FIG. 2, that is, the column direction.

The rotary shaft 15 is supported by a supporting member 14 constituting the movable unit 13.

The supporting member 14, which constitutes a base body of the movable unit 13, is configured to change its position in an apparatus main body 2 along the up-down direction, that is, in a direction in which the supporting member 14 advances and retreats with respect to a measurement target. A recessed portion 14a is formed on a side surface of the supporting member 14, and a restricting portion 2d that has a protruding shape and that is formed inside the apparatus main body 2 enters the recessed portion 14a. As such, the movement range of the supporting member 14, that is, the movable unit 13, in the up-down direction is restricted.

A pressing spring 30 which is an example of a pressing member is provided on an upper portion of the supporting member 14, and the supporting member 14, that is, the movable unit 13, is pressed downward, that is, in a direction toward the measurement target. In a state in which the colorimetric apparatus 1B is not pressed toward the measurement target, the driven roller 16 slightly protrudes downward from a bottom surface 2a of the apparatus main body 2, as indicated by a dash-double-dot line and a reference numeral 16-1 in FIG. 7. When the apparatus main body 2 is pressed toward the measurement target during color measurement, the driven roller 16 no longer protrudes downward from the bottom surface 2a of the apparatus main body 2, as indicated by a solid line, and the driven roller 16 is pressed toward the measurement target while being in such a state.

The rotary shaft 15 is provided with a toothed gear 20, and the rotation of the rotary shaft 15 is transmitted via a gear 21 to a gear 22. The toothed gear 22 is provided with a rotation scale 26 having a disc shape, and the rotation scale 26 rotates integrally with the toothed gear 22.

The rotation scale 26 constitutes a rotary encoder 25 that is an example of a detector that detects the rotation of the driven roller 16. A detector 27 facing the rotation scale 26 detects the rotation of the rotation scale 26 and transmits a detection signal to a control unit 10. Accordingly, the control unit 10 can detect the direction of rotation and the amount of rotation of the driven roller 16.

Since the outer circumference of the driven roller 16 is known, a displacement of the apparatus main body 2 in the predetermined direction can be acquired by the control unit 10 based on the amount of rotation of the driven roller 16. Accordingly, similar to the embodiment described above, a displacement from a measurement start position to a measurement position (optical axis CL) can be acquired, and thus the occurrence of a color measurement error can be suppressed compared to a configuration in which adjacent color patches are identified based on a color difference between the adjacent color patches.

Furthermore, the driven roller 16 is configured to change its position in a direction in which the driven roller 16 advances and retreats with respect to the measurement target and is pressed toward the measurement target by the pressing spring 30 in a direction advancing toward the measurement target. Accordingly, the driven roller 16 can maintain a good contact state with the measurement target.

Figure 8:
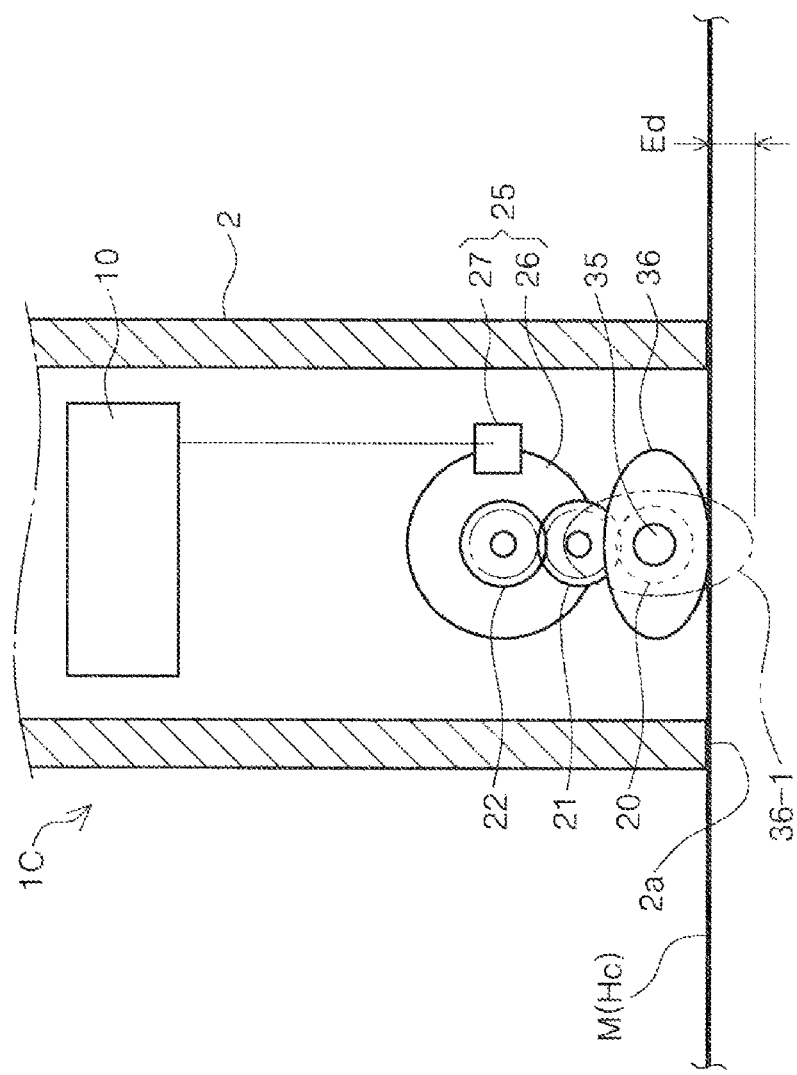
FIG. 8 is a cross-sectional view of a main part of a colorimetric apparatus according to another embodiment.

Next, a colorimetric apparatus 1C according to a third embodiment will be described with reference to FIG. 8. In the colorimetric apparatus 1C, a driven roller 36 having an elliptical shape is fixedly provided with respect to an apparatus main body 2. As such, the apparatus main body 2 moves up and down within the range of a dimension Ed as the apparatus main body 2 moves in a predetermined direction.

A rotary shaft 35 is provided with a toothed gear 20; similar to the second embodiment described above, a rotation scale 26 is configured to rotate via a toothed gear 21 and a toothed gear 22.

Since the driven roller 36 is fixedly provided in the present embodiment, when the apparatus main body 2 is moved in a predetermined direction while the driven roller 36 is in a state indicated by a reference numeral 36-1, the moving speed of the apparatus main body 2 increases, that is, the rotational speed of the rotary shaft 35 increases, as the major axis of the driven roller 36 approaches a horizontal position, and the moving speed reaches the maximum value when the driven roller 36 is in a state indicated by a solid line, that is, in a state in which the major axis of the driven roller 36 is at a horizontal position. When the apparatus main body 2 is continuously moved in the predetermined direction while being in this state, the moving speed of the apparatus main body 2 decreases, that is, the rotational speed of the rotary shaft 35 decreases, and the moving speed reaches the minimum value when the driven roller 36 is in the state indicated by the reference numeral 36-1, that is, in a state in which the major axis of the driven roller 36 is at a vertical position. As such, the rotational speed of the rotary shaft 35 generates a waveform similar to that illustrated in FIG. 6C (however, the phase is offset by $\lambda c/2$), and thus the control unit 10 can acquire the position of the adjacent color patch T (m, n) based on the rotational speed of the rotary shaft 35. As a result, the occurrence of a color measurement error can be suppressed compared to a configuration in which adjacent color patches are recognized based on a color difference between the adjacent color patches.

Note that in the present embodiment, the driven roller 36 may also be configured to be detachable.

Note that the present disclosure is not intended to be limited to the aforementioned examples, and many variations are possible within the scope of the disclosure as described in the appended claims. It goes without saying that such variations also fall within the scope of the present disclosure.

What is claimed is:

1. A colorimetric apparatus comprising:
   an opening portion that is disposed at a bottom of an apparatus main body and that introduces light arriving from a measurement target to inside the apparatus main body;
   an incident light processing unit that processes light incident through the opening portion;
   a rotor that is provided at the bottom of the apparatus main body and is in contact with the measurement target, the rotor having an elliptical shape and being driven to rotate about a rotary shaft when the apparatus main body moves in a predetermined direction;
   a detector that detects displacement of the rotary shaft in a direction in which the rotary shaft advances and retreats with respect to the measurement target as the rotor rotates; and
   a control unit that receives a signal from the incident light processing unit and the detector.

2. The colorimetric apparatus according to claim 1, wherein
   the rotary shaft is supported by a supporting member,
   the supporting member is configured to be displaced in a direction in which the supporting member advances and retreats with respect to the measurement target and is pressed toward the measurement target by a pressing member, and
   the detector detects displacement of the rotary shaft through the supporting member.

3. The colorimetric apparatus according to claim 1, wherein
   the measurement target is a color chart in which a plurality of color patches are arranged, and
   a circumference of the rotor is determined by a width of the plurality of color patches.

4. The colorimetric apparatus according to claim 3, wherein
   an integral multiple of the circumference of the rotor or an integral multiple of a half of the circumference corresponds to the width of the color patches.

5. The colorimetric apparatus according to claim 4, wherein
   the rotor is detachably provided.

6. A colorimetric apparatus comprising:
   an opening portion that is disposed at a bottom of an apparatus main body and that introduces light arriving from a measurement target to inside the apparatus main body;
   an incident light processing unit that processes light incident through the opening portion;
   a rotor that is provided at the bottom of the apparatus main body and is in contact with the measurement target, the rotor being driven to rotate when the apparatus main body moves in a predetermined direction, the rotor having an elliptical shape;
   a detector that detects the rotation of the rotor; and
   a control unit that receives a signal from the incident light processing unit and the detector.

7. The colorimetric apparatus according to claim 6, wherein
   the rotor is configured to be displaced in a direction in which the rotor advances and retreats with respect to the measurement target and is pressed toward the measurement target by a pressing member.

8. A colorimetric apparatus comprising:
- an opening portion that is disposed at a bottom of an apparatus main body and that introduces light arriving from a measurement target to inside the apparatus main body;
- an incident light processing unit that processes light incident through the opening portion;
- a rotor that is provided at the bottom of the apparatus main body and is in contact with the measurement target, the rotor being driven to rotate when the apparatus main body moves in a predetermined direction;
- a detector that detects the rotation of the rotor;
- a control unit that receives a signal from the incident light processing unit and the detector;
- a moveable support unit that supports the rotor; and
- a pressing member that moves the moveable support unit.

9. The colorimetric apparatus according to claim 8, wherein
- the rotor is configured to be displaced in a direction in which the rotor advances and retreats with respect to the measurement target and is pressed toward the measurement target by a pressing member.

* * * * *